Figure 1:
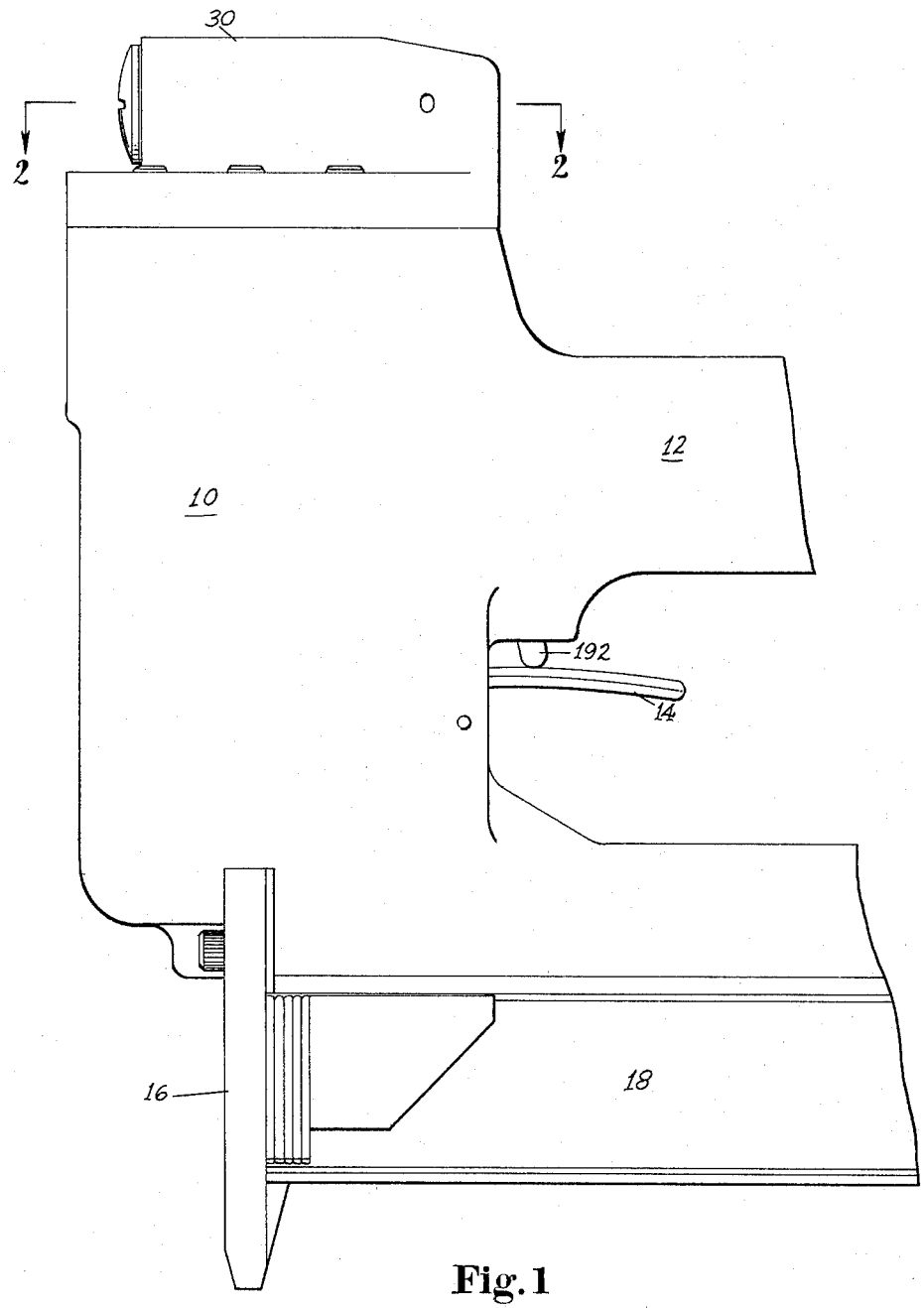

Oct. 11, 1966   C. T. BECHT ETAL   3,278,104
FASTENER APPLYING DEVICE
Filed Sept. 14, 1965   5 Sheets-Sheet 2

INVENTORS
*CARL T. BECHT,*
AND *FRANK W. PUGH,*
BY *Yungblut, Melville, Strasser and Foster*
ATTORNEYS Oct. 11, 1966   C. T. BECHT ETAL   3,278,104
FASTENER APPLYING DEVICE
Filed Sept. 14, 1965   5 Sheets-Sheet 3

INVENTORS
CARL T. BECHT,
AND FRANK W. PUGH,
BY *Yungblut, Melville, Strasser and Foster*
ATTORNEYS

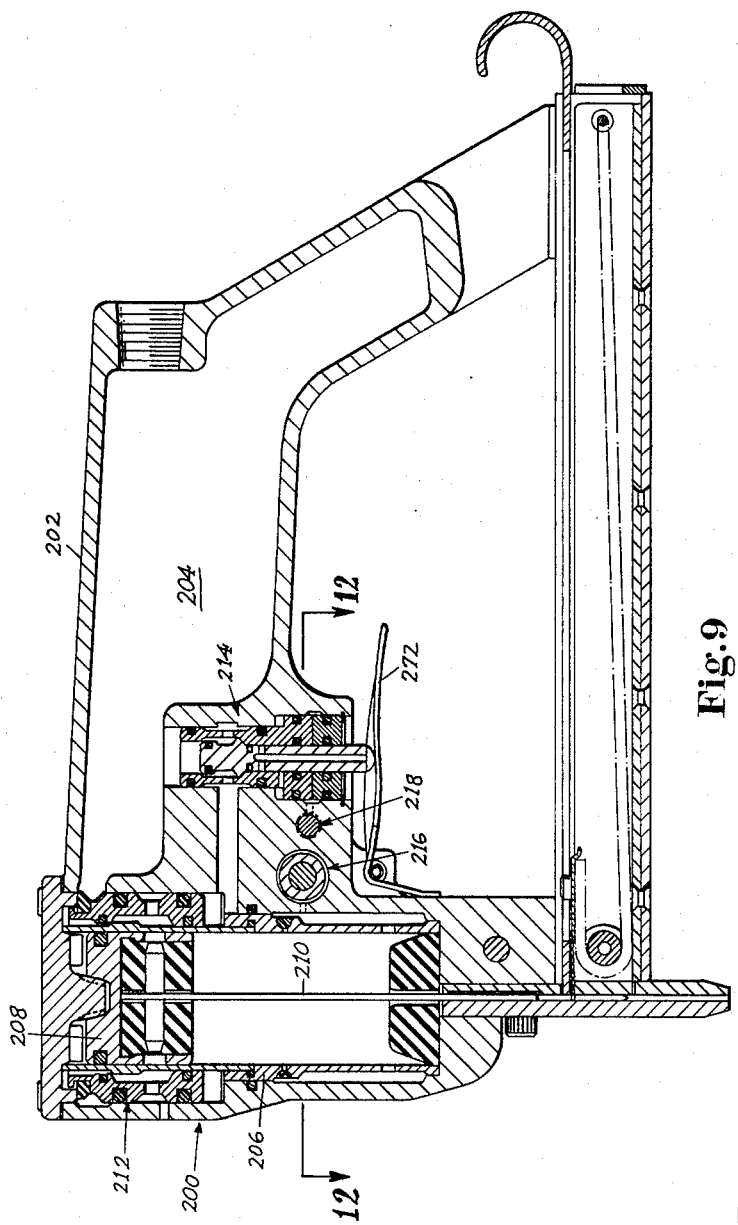

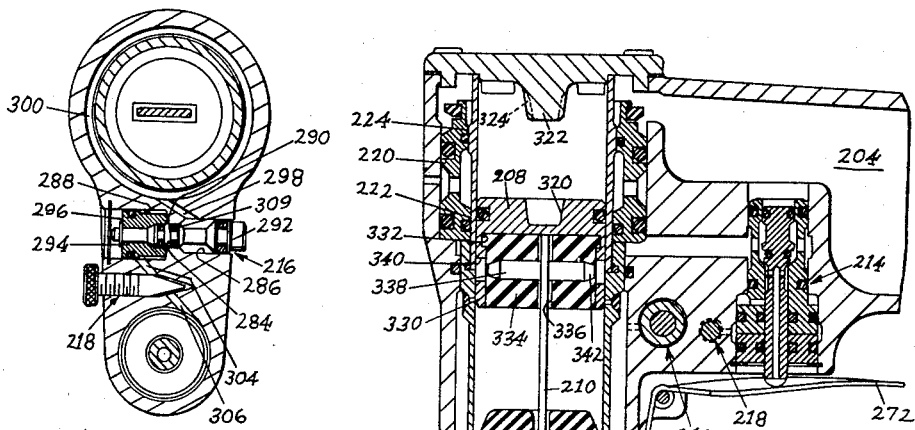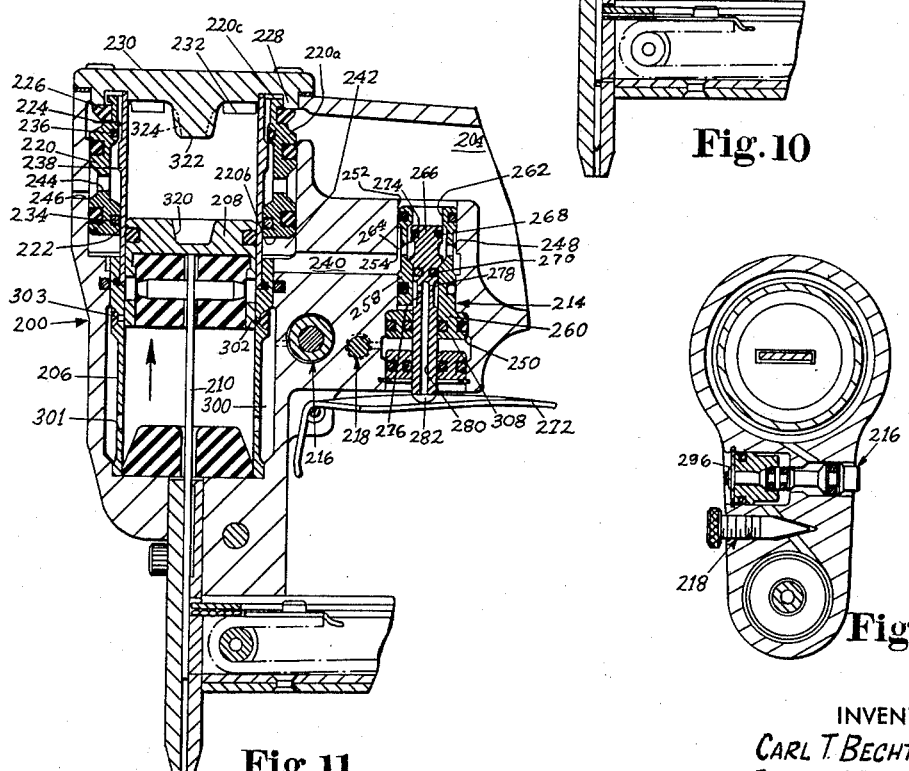

United States Patent Office

3,278,104
Patented Oct. 11, 1966

3,278,104
FASTENER APPLYING DEVICE
Carl T. Becht and Frank W. Pugh, both of Cincinnati, Ohio, assignors to Senco Products, Inc., Cincinnati, Ohio, a corporation of Ohio
Filed Sept. 14, 1965, Ser. No. 487,110
23 Claims. (Cl. 227—130)

This application relates to pneumatic tools, and particularly to an improved valve structure for pneumatic tools. The invention has great and particular utility in connection with pneumatic fastener applying devices, as will be seen from the specific embodiments described in detail hereinafter.

As is well known in the art, a pneumatic fastener applying device, such as a stapler, includes a housing within which a working cylinder is defined, a driving piston reciprocable in the working cylinder, a fastener driver secured to the piston, means for successively feeding a plurality of staples or fasteners into position to be driven by the driver, and valve means for controlling the admission of compressed air into the working cylinder. The various requirements for the main or firing valve are also well known in the art. Specifically, the firing valve should have as large an area as possible, and should open very quickly, in order that the full force of the compressed air can be transmitted instantly to the driving piston. One example of such a firing valve is disclosed in United States Patent No. 3,170,487 dated February 23, 1965, in the names of Albert G. Juilfs and Carl T. Becht.

The valve of the above noted United States patent is so rapid in operation that the limiting factor in a stapler embodying such a valve is the speed at which the operator can manually manipulate the trigger. Accordingly, it is commercially desirable to develop a fastener applying device which, upon a single manipulation of a manual trigger, will automatically drive a large number of fasteners in succession. That is, an "Auto-Fire" stapler with which an operator can drive a plurality of staples by simply pulling the trigger and moving the stapler along the work piece.

Co-pending applications Serial No. 368,855 filed May 20, 1964, in the name of Carl Siegmann, and 445,873 filed April 6, 1965, in the names of G. C. Juilfs, F. W. Pugh and C. T. Becht disclose various embodiments of such a device.

The instant application has for one of its objects the provision of an improved valve structure for a fastener applying device.

Another object is an improved valve structure which will permit the fastener applying device to be operated in a "single-fire" or an "auto-fire" mode of operation.

Still another object of the invention is to provide such a valve system involving no springs at all, whereby optimum efficiency and accuracy of timing is achieved.

Still another object of the invention is to provide an oscillating valve structure which will, in turn, control the operation of the firing valve of the fastener applying device to which it is applied.

Ancillary to the above, it is also an object of this application to provide an improved means for retaining the driving piston in its upper or "at rest" position.

It is a further specific object of this invention to provide an improved structure and apparatus for securing the fastener driver to the driving piston. Still another object of the invention is the provision of a firing valve embodying the principles of the aforementioned United States Letters Patent, and which achieves a significant reduction in the height of the tool on which it is used.

Figure 2:
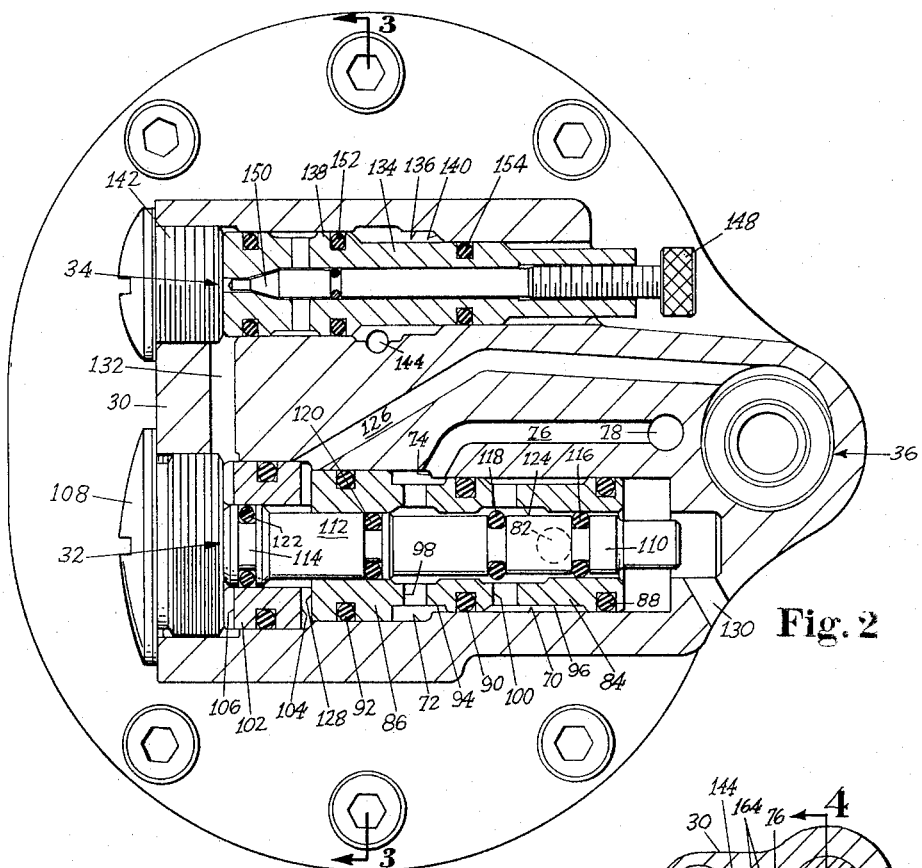
Figure 3:
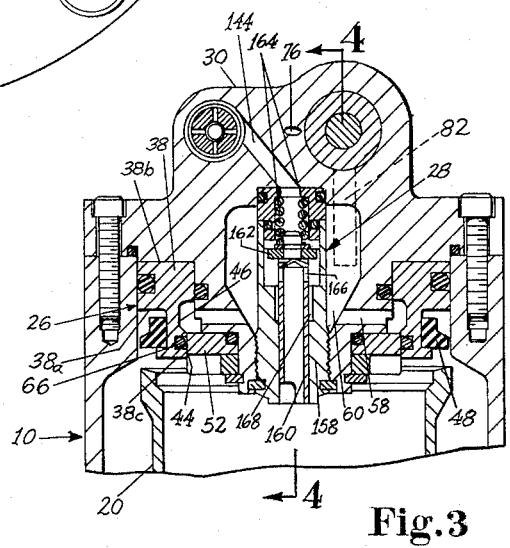
Figure 4:
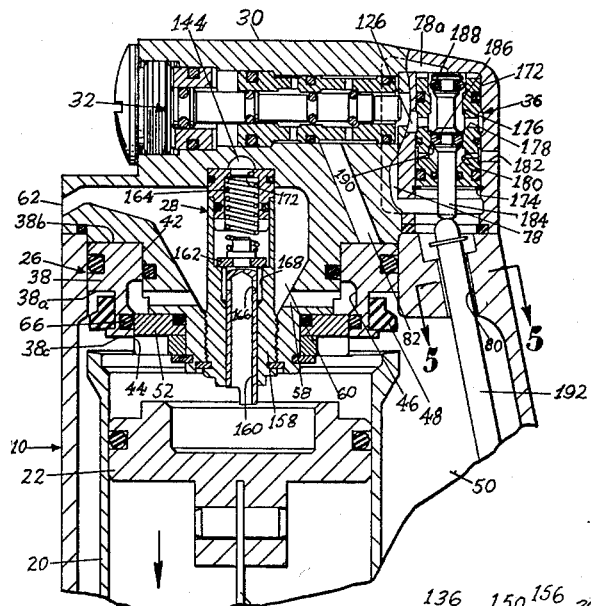
Figure 5:
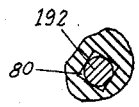
Figure 6:
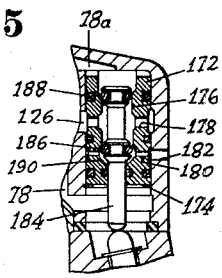
Figure 7:
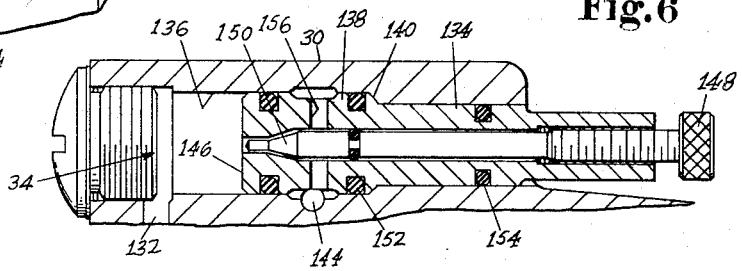
Figure 8:
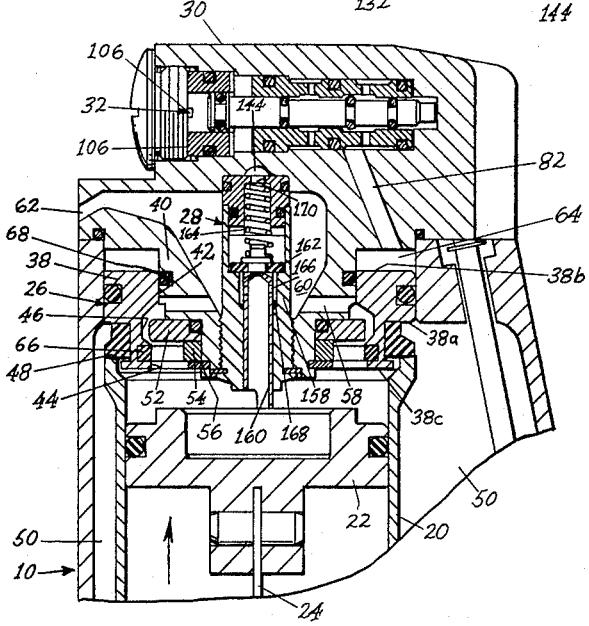

Various other objects and advantages of this invention will become apparent to the skilled worker in the art upon reading this specification and the accompanying drawings. These drawings illustrate several specific modifications of the invention, but it is to be understood that no limitation is intended thereby. In the drawings:

FIGURE 1 is a fragmentary side elevational view of a fastener applying device embodying this invention;
FIGURE 2 is a horizontal cross-sectional view taken along the line 2—2 in FIGURE 1;
FIGURE 3 is a vertical cross-sectional view taken along the line 3—3 in FIGURE 2;
FIGURE 4 is a vertical cross-sectional view taken along the line 4—4 in FIGURE 3;
FIGURE 5 is a fragmentary cross-sectional view taken along the lines 5—5 in FIGURE 4;
FIGURE 6 is a fragmentary cross-sectional view of a portion of FIGURE 4, showing certain elements in a different position of operation;
FIGURE 7 is a fragmentary cross-sectional view of a portion of FIGURE 2, showing a different position of operation;
FIGURE 8 is a cross-sectional view similar to FIGURE 4 showing the elements in a different position of operation;
FIGURE 9 is a cross-sectional view of a modification of the invention;
FIGURE 10 is a fragmentary cross-sectional view similar to FIGURE 9 but showing a different position of operation;
FIGURE 11 is a fragmentary cross-sectional view similar to FIGURE 9 showing the elements in a different position of operation;
FIGURE 12 is a cross-sectional view along the line 12—12 of FIGURE 9; and
FIGURE 13 is a cross-sectional view similar to FIGURE 12 but showing certain elements in a different position of operation.

Briefly considered, this invention contemplates a fastener applying device for use with a supply of compressed air, and including a working cylinder with a driving piston and fastener driver reciprocable therein, and a main valve (sometimes called firing valve) controlling the flow of fluid into the working cylinder. The main valve itself will be pneumatically actuated; that is, the opening and closing of the main valve is controlled by further valve means which regulate the pressure applied to a portion of the main valve.

Specifically, this invention contemplates in oscillating valve structure including a valve bore having a first port in communication with the supply of compressed air, and a second port in communication with a portion of the main valve. Slidable within the valve bore are a pair of cooperating elements including a valve cage which is movable between two positions within the bore, and a valve core, slidable within the cage between two positions relative to the bore. The valve cage also includes at least two ports which are in continuous communication respectively within the two ports in the bore noted above. The valve cage and valve core include sealing means so arranged that when both the valve cage and the valve core are in their first positions, compressed air can pass through the first port into the valve bore and then through the second port into communication with a portion of the main valve. Upon movement of one of the cooperating elements (i.e. the valve cage or valve core) to its second position, this communication between the first and second ports in the bore is cut off, and the second port is vented to atmosphere, thereby effecting the opening of the main valve, and the driving of a fastener into a work piece. It will of course be understood that the above mentioned movement of one of the cooperating elements from its first position to its second position is brought about by actuation by the operator of the manual trigger.

After the main valve has opened and the compressed air has been admitted into the working cylinder, means are provided for using a portion of the compressed air admitted into the working cylinder to move the other of the cooperating elements (the one which was not moved by the operator) to its second position. This brings the two cooperating elements, the cage and core, into the same relative position they originally occupied, and once again establishes communication between the first and second ports in the bore, thereby causing the main valve to move to its closed position.

Upon closing of the main valve, the driving piston will return to its original position, and the cooperating element which was moved to its second position by the compressed air admitted to the working cylinder will be returned to its original position. (The cooperating element moved in response to the manual trigger will remain in its second position.) As explained before, this will prevent communication between the first and second ports in the bore, and effect the opening of the main valve once again.

It should be apparent that the above described cycle will be carried out repetitively so long as the manual trigger under the control of the operator remains actuated.

General arrangement

Referring now to FIGURE 1, a conventional fastener applying device has been shown in side elevation. The device includes the housing indicated generally at 10 within which is provided a working cylinder, a piston reciprocable in the working cylinder, and a fastener driver secured to the piston. Extending rearwardly from the housing 10 is the handle portion 12, adapted to be gripped by an operator during use. The handle portion 12 also serves as a reservoir for compressed air. Pivotally secured just below the junction of the handle 12 and housing 10 is the manual trigger 14, which is pivotally movable by the operator to actuate the device. Extending rearwardly from the nose portion 16 of the fastener is the magazine 18 which, as well known in the art, will carry a plurality of fasteners, and feed them successively into the nose portion 16 of the device in a position to be driven by the fastener driver on its working stroke.

Referring now to FIGURES 3, 4, and 8, the upper portion of the housing 10 is shown in cross section. It will be seen in these figures that the working cylinder is defined by a cylindrical sleeve 20. The piston which is reciprocable in the cylinder is indicated at 22, and the fastener driver is shown at 24.

Disposed directly over the working cylinder 20 is the springless main valve indicated generally at 26. This valve is shown in the closed position in FIGURE 8, and in the open position in FIGURES 3 and 4. The details of construction of the springless main valve 26 have been fully explained in the United States Letters Patent No. 3,170,487 referred to earlier, and do not, as such, form a part of the instant invention. However, for the sake of clarity in describing the operation of this invention, the springless firing valve will be briefly reviewed hereinafter.

Coaxially disposed within the springless main valve 26 is the auto-fire valve 28. The details and operation of this valve have been disclosed in application Serial No. 445,873 referred to above, but again, the operation of the auto-fire valve will be briefly reviewed hereinafter.

Horizontally disposed within the cap 30 are the oscillating valve indicated generally at 32 (and which forms a very important part of this invention) and a mode selector valve indicated generally at 34 (see FIGURE 2).

Vertically disposed at the rear of the cap 30 is the auxiliary valve indicated generally at 36. As will become apparent as this specification proceeds, it is this auxiliary valve 36 which is operated by actuation of the manual trigger 14.

Springless main valve

The springless firing valve includes the generally tubular body which is slidable within the housing 10 and about the cylindrical post 40 which depends from the cap 30. The internal surface of the valve body 38 is defined by the concentric bore 42 in its upper end and the bore 44 in the lower end. It will be observed that the bore 44 is larger in diameter than the bore 42. Intermediate the bores 42 and 44 is the relieved central portion 46.

Slidably disposed in an annular recess on the exterior of the body 38 is the resilient sealing ring 48 which effects a seal when it contacts the top surface of the cylinder sleeve 20, preventing passage of compressed fluid in the reservoir 50 from entering the working cylinder. (The main valve is shown in the closed or seated position in FIGURE 8.)

Fixedly secured near the lower end of the post 40 is the exhaust washer 52. This washer is actually held in position by the spacer 54 and the snap ring 56.

Located just above the exhaust washer 52, the depending post 40 is provided with the radial exhaust passages 58, which in turn communicate with the space 60 in the cap, which is opened to atmosphere as at 62.

In the closed position shown in FIGURE 8, the resilient member 48 is seated upon the top surface of the cylinder sleeve 20. Air under pressure in the reservoir 50 will be acting upwardly on the surface 38a of the valve body 38 and downwardly on the resilient member 48. It will be observed that the resilient member 48 is very slightly smaller in diameter than the surface 38a, resulting in a net upward force on the valve body 38. At the same time, however, air under pressure has passed through various valves and passage structure defined hereinafter into the space 64 above the top surface 38b of the valve body 38. Since the air pressure in the space 64 is equal to that of the air in the reservoir 50, it will be apparent that the valve body is urged to the downwardly position by virtue of the greater area 38b over the resultant area of 38a less 48.

The main valve is caused to open by venting the space 64 to atmosphere. As the pressure upon the surface 38b reaches zero, the resultant upward force (38a minus 48) is sufficient to lift the valve body 38 and resilient member 48 off its seat on the cylinder sleeve 20. By observing FIGURE 8 carefully, it will be observed that the valve body 38 can move upwardly a short distance before the resilient member 48 is lifted off its seat. This is effective to bring the O-ring 66 carried in the bore 44 into contact with the exhaust washer 52.

At the instant that the resilient member 48 lifts off its seat, the entire surface area of the lower end of the piston 38 (the area 38c) is exposed to air under pressure within the reservoir 50, resulting in a "pop" opening of the main valve.

Closure of the main valve is effected by reintroducing air under pressure into the space 64 above the main valve piston. It will be recalled that the bore 44 in the lower end of the valve body 38 is larger in diameter than the bore 42. Inasmuch as in the up position (seen in FIGURES 3 and 4) these bores are sealed respectively against the post 40 by the O-ring 68 and against the exhaust washer 52 (which is in effect a fixed part of the post) by the O-ring 66, the effective surface area of the surface 38b is greater than the effective surface area of the combined surfaces 38a, 38c. By virtue of this greater area being exposed to the same pressure as the under side of the valve body 38, the resultant downward force is operative to return the main valve to its closed position.

Oscillating valve

The oscillating valve 32 of this embodiment is horizontally disposed in the cap 30 as generally explained before. Referring to FIGURES 2, 4, and 8, the oscillating valve includes the bore 70–72 having a first port 74 which is in continuous communication through the passages 76, 78, and 80 with air under pressure in the reservoir 50, and a second port 82 which communicates with the space 64 above the springless main valve 26.

Slidable within the bore 70–72 is the valve cage 84 having the enlarged end portion 86. The exterior surface of the valve cage 84 is provided with the O-rings 88, 90 and 92, and with the relieved portions 94 and 96 in the area of the ports 74 and 82 respectively of the valve bore. The relieved portions 94 and 96 are provided respectively with the radial ports 98 and 100.

By comparing FIGURES 2 and 4, it will be seen that the valve cage 84 is slidable in the bore between a first position (shown in FIGURE 2) and a second position (shown in FIGURE 4). In the first position, the valve cage is abutting the spacer 102 which is provided on its end with the radial slots 104 and 106. The spacer 102 is securely held in position by the threaded plug 108.

Slidable within the valve cage 84 is the valve core 110–112–114. It will be observed that the portions 110–112–114 of the valve core are progressively larger in diameter. The valve core 110–112–114 carries the O-rings 116, 118, 120, and 122. The O-rings 120 and 122 seal the valve core within the left most portion of the valve cage 84 and the spacer 102 respectively. The O-rings 116 and 118 are slidable from positions engaging the inner surface of the valve cage 84 into the relieved space 124 on its inner surface.

In the position shown in FIGURE 2, air under pressure from the reservoir 50 will flow through the passages 80, 78, 76 and the ports 74 into the bore 72 in the area of the relieved portion 94 of the valve cage. This air can than pass through the radial ports 98, along the portion 110 of the valve core, past the O-ring 118, out the radial ports 100 and into the relieved area 96, then through the passage 82 into the space above the springless main valve. It will be observed that the increased diameter of the portion 86 of the valve cage provides a greater effective surface area which under the influence of air under pressure, biases the valve cage to the position shown in FIGURE 2.

To operate the oscillating valve, the auxiliary valve 36 (described in detail hereinafter) is actuated to place the passage 126 into communication with air under pressure in the reservoir 50. This air under pressure flows through the passage 126, and through the slots 104 in the spacer 102, thereby acting on the largest portion 114 of the core, holding it in its initial or left position as shown in FIGURE 2, and also acts upon the surface 128 of the enlarged end 86 of the valve cage. It will be recalled that compressed air entering at the port 74 tends to bias the valve cage to its initial or left position by virtue of the differential in size between the enlarged end 86 and the remainder of the valve cage 84. The application of fluid under pressure to the surface 128 is sufficient to overcome this resultant force, thereby moving the valve cage 84–86 to its second or right hand position shown in FIGURES 4 and 8. In sequence, this movement of the valve cage will bring the O-ring 118 into contact with the inner surface of the valve cage, thereby cutting off communication between the ports 74 and 82, and then the O-ring 116 will move into the relieved space 124, bringing the passage 82 into communication with atmosphere via the relieved portion 96, the radial port 100, the relieved portion 124, past the O-ring 116, and out the passage 130 to atmosphere. As explained before, this reduction in air pressure on top of the springless main valve will cause it to open, effecting the first half of the normal cycle of the device of this invention.

The springless main valve is caused to close by venting the passage 126 to atmosphere, which permits air under pressure flowing through the port 74 to return the valve cage to its initial position.

It will thus be seen that the oscillating valve just described in cooperation with the mode selector valve described in more detail hereinafter permits the fastener applying device of this invention to be operated in a "single-fire" mode of operation. That is, each time the manual trigger 14 is actuated, a single working cycle will be effected.

It is also desirable to operate the device of this invention in an "auto-fire" mode of operation. To this end, the auto-fire valve 28 and the mode selector valve 34 (both described in more detail hereinafter) can be arranged so that a portion of the compressed air admitted into the working cylinder will be delivered through the structure described in more detail hereinafter to the passage 132 in the cap 30 which connects the mode selector valve 34 with the oscillating valve 32. The air under pressure in the passage 132 can pass through the radial slots 106, and act upon the head 114 of the oscillating valve core. It will be seen that the head 114 is larger in area than the other portion of the core, so that this pressure is effective to move the valve core from its initial position shown in FIGURE 2 to its position shown in FIGURE 8. It will be apparent that this will bring the valve cage and valve core into the same position relative to each other as was occupied in FIGURE 2. That is, the O-ring 116 is in sealing engagement with the inner surface of the cage, preventing communication between the passage 82 and the exhaust passage 130, and air under pressure can pass from the port 74 to the passage 82, and back on top of the springless main valve.

Upon closing of the springless main valve, the space in the working cylinder above the piston will be vented to atmosphere via the passages 58, the space 60 and the port 62. This will of course remove the pressure in the passage 132 which had acted to force the core to the second or right hand position shown in FIGURE 8, thereby permitting it to return under the influence of pressure passing through the port 126 to its initial or left hand position shown in FIGURE 2. The valve cage, under the influence of pressure acting on surface 128 remains in its second or right hand position as shown in FIGURE 4, thereby opening the passage 82 to atmosphere as described before. Thus, in the "auto-fire" mode of operation, the valve cage is moved from its initial position upon actuation of the manual trigger 14 by the operator. This is effective to open the springless main valve. Repetitive cycling (i.e. opening and closing) of the springless main valve is effected by means of the oscillation of the core 110–112–114.

*Mode selector valve*

The mode selector valve 34 is also horizontally mounted in the cap 30 as generally described earlier. It includes the tubular sleeve 134 which is slidably received in a bore 136 in the cap. The sleeve 134 includes the enlarged portion 138 which, in combination with the shoulder 140, limits its movement to the right when viewed as in FIGURES 2 and 7. Leftward movement of the sleeve 134 is limited by the plug 143 which is threadedly secured to the cap 30.

The bore 136 of the mode selector valve communicates via the passages 144 (see FIGURES 2, 3, 4, 7 and 8) with the auto-fire valve indicated generally at 28. The bore 136 also communicates at its left most end with the passage 132, described above.

Threadedly secured in the center of the mode selector sleeve 134 is the throttle control rod 148 which includes the formed tip 150 as shown in the drawings.

The mode selector sleeve 134 and throttle control 148 move as a unit between the "single-fire" position shown in FIGURE 2 and the "auto-fire" position shown in FIGURE 7. In the "single-fire" position, air under pressure from the working cylinder will pass through the auto-fire valve as described hereinafter, and the passage 144 into the bore 136. When the mode selector valve is in the position shown in FIGURE 2, the sleeve is sealed within the bore by means of the O-rings 152 and 154, and is pulsed toward the left or "single-fire" position.

By comparison, when the mode selector valve is in the "auto-fire" position shown in FIGURE 7, air under pressure entering the bore 136 via the port 144 passes through the radial ports 156, past the formed tip 150 of the throttle control, and into the passage 132 which connects the mode selector valve with the oscillating valve as described earlier. Pressurized air also acts on the entire end 146 (see FIGURE 7) of the tubular sleeve 134, pulsing it to the right or "auto-fire" position.

Auto-fire valve

As indicated earlier, the auto-fire valve shown generally at 28 has been described in more detail in the copending application Serial No. 445,873 previously referred to. Very briefly considered, the auto-fire valve includes the valve housing 158, the tubular actuator 160, the valve seal 162, and the spring 164 normally biasing the valve seal 162 toward its seat.

When the working piston 22 is in its uppermost position (not shown in the drawings), its top surface will contact the tubular actuator 160, lifting it against the bias of the spring 164 so that the valve seal 162 is off its seat. When the firing valve 26 is opened, admitting compressed air into the working cylinder and driving the piston 22 downwardly, a portion of the compressed air will act upwardly through the hollow center of the actuator 160, the ports 166, and the relieved space 168 to overcome the bias of spring 164 and lift the valve seal 162 off its seat. This air will then pass around the valve seal 162, through the port 170 at the top of the auto-fire valve, and thence through the passage 144 described above to the mode selector valve 34. Air will continue to pass around the valve seal 162 and through the auto-fire valve until the pressure of the fluid above and below the valve seal 162 is substantially equal, at which time the spring will close the valve.

It will be observed that even in the "auto-fire" position of the mode selector valve, the auto-fire valve seal 162 cannot close until the pressure above it is substantially equal to the pressure in the working cylinder. This will insure that sufficient pressure exists in the passage 132 to force the oscillating valve core 110–112–114 to its second position, thereby effecting a closure of the springless firing valve 26.

With the mode selector valve in the "auto-fire" position, and once pressure has built up in the system above the auto-fire valve seal 162 (including the passages 144 and 132) sufficient to cause the core 110–112–114 to move to its second or right hand position as shown in FIGURE 8, the springless main valve 26 is caused to close. This will prevent communication or flow of air under pressure from the reservoir 50 into the working cylinder 20, and at the same time will vent the working cylinder to atmosphere via the passages 58, the space 60, and the port 62. This will of course reduce the pressure on the under side of the auto-fire valve seal 162, and the combination of pressure above the valve and the spring 164 will force it tightly against its seat. The pressure in the system above the auto-fire valve will of course be sufficient to hold the core 110–112–114 of the oscillating valve in its second or right position.

When the main piston 22 returns to its uppermost position, it will contact the depending stem of the tubular actuator 160, thereby lifting the auto-fire valve seal 162 off its seat against the resistance of spring 164 and the air pressure trapped there above. This will permit the air in the passages 132, 144, and in the auto-fire valve housing to exhaust, around the auto-fire valve seal 162, through the relieved spaces 168, the port 166, the tubular actuator 160, past the exhaust washer 52, through the ports 58, into the space 60 and out the port 62 to atmosphere. When the air pressure in the passage 132 is reduced, air pressure entering the oscillating valve bore through the passage 126 returns the core to its initial position shown in FIGURE 2, thereby repeating the cycle of operation described above.

Auxiliary valve

It will be recalled that the auxiliary valve indicated generally at 36 is actuated in response to movement of the manual trigger 14, and serves to place the passage 126 in communication with the air under pressure in the reservoir 50, thereby initially shifting the valve cage 84 of the oscillating valve to its second or right hand position shown in FIGURES 4 and 8.

The auxiliary valve indicated generally at 36 includes the valve housing 172 which is held in a suitable bore in the cap 30 by the ring clip 174. The housing 172 includes the central bore 176, and the two sets of radial ports 178 and 180. The ports 178 communicate directly with the passage 126 referred to earlier (see FIGURE 2), while the ports 180 communicate with the opening 182 to atmosphere. The bore 176 of the housing is in communication with the compressed air in the reservoir 50 via the passage 78, 78a.

Slidable within the housing 172 is the auxiliary valve stem 184, which carries the O-rings 186 and 188 movable into and out of engagement with the bore 176 of the housing 172.

In the normal position shown in FIGURE 6, the auxiliary valve stem 184 is in its lowermost position, in which the O-ring 188 is in sealing engagement with the bore 176, while the O-ring 186 is in the relieved space 190 of the auxiliary valve housing. In this condition, the passage 126 is open to exhaust, through the ports 178, past the O-ring 186, the relieved area 190, the ports 180, and the port 182.

The auxiliary valve stem 184 is movable from the position shown in FIGURE 6 to the open position shown in FIGURE 4, by means of the actuator rod 192. Referring briefly to FIGURE 1, it will be seen that the actuator rod 192 extends out of the bottom of the handle portion 12 of the housing, and is contacted and moved upwardly by the manual trigger 14. In the open position of FIGURE 4, it will be observed that the O-ring 188 on the auxiliary valve stem has moved out of contact with the bore 176, while the O-ring 188 has moved into contact with the bore. This permits compressed air in the passage 78a to flow past the O-ring 188, through the radial ports 178, and into the passage 126. As explained before, this will force the oscillating valve cage to its second or right hand position as seen in FIGURE 4, thereby initiating a working cycle of the fastener applying device. The O-ring 188, coming into contact with the bore 176, is effective to seal the exhaust passages 180, 182.

Operation

It is believed that the operation of the device of FIGURES 1 through 8 will be clear from the foregoing description. By way of review, the operator, upon beginning a given operation, will set the mode selector valve indicated generally at 34 for either the "single-fire" position shown in FIGURE 2 or the "auto-fire" position shown in FIGURE 7.

Assuming that the "single-fire" mode of operation has been selected, and that the device has been connected to a suitable source of air under pressure, the auxiliary valve 36 will be in the position indicated in FIGURE 6, the oscillating valve 32 will be in the position indicated in FIGURE 2, and the springless main valve 26 will be in the position indicated in FIGURE 8. More specifically, compressed air from the reservoir 50 will flow through the passages 78, 76, through the port 74 and into the oscillating valve 32. As explained before, the design of the valve members insures that the air entering the port 74 will retain the valve cage 84 in the initial or left hand position shown. In this position, the compressed air can pass from the first port 74 to the passage 82, into the space above the springless firing valve body 38. This, as explained before, will hold the valve on its seat.

To actuate the device, the operator moves the manual trigger to its firing position, which in turn moves the rod 192 and the auxiliary valve stem 184 to the position shown in FIGURE 4. This admits air under pressure from the reservoir 50 via the passage 78, 78a, through the auxiliary valve, including ports 178, into the passage 126. The passage 126 communicates with the enlarged head 86 of the oscillating valve cage, and the introduction of air under pressure to the surface 128 of the enlarged head 86 is effective to move the valve cage from its initial position to its second position shown in FIGURES 4 and 8. This relative movement between the valve cage 84 and valve core 110-112-114 prevents communication between the port 74 and the passage 82, and immediately thereafter opens the passage 82 to atmosphere via the passage 130. This reduction in air pressure above the springless main valve 38 permits it to open, allowing air in the reservoir 50 to flow into the working cylinder 20, driving the piston in its working stroke.

Once the main valve 26 has opened, air under pressure in the working cylinder will open the auto-fire valve seal 162, but the air passing through the auto-fire valve and the passage 144 into the mode selector valve can go no further.

Therefore, when the operator releases the manual trigger 14, permitting the auxiliary valve stem 184 to return to its initial position shown in FIGURE 6, the air in passage 126 can pass through the ports 178, past the O-ring 188, through the ports 180 and out the port 182 to atmosphere. When the pressure in the passage 126 is reduced, the continuous pressure in the passage 76 and entering the oscillating valve bore via the port 74 will return the valve cage 84 to its initial position shown in FIGURE 2. This will once again establish communication between the port 74 and the passage 82, permitting compressed air to enter the space 64 above the main valve body 38, causing it to close.

Assuming now that the "auto-fire" mode of operation has been selected, the initial sequence will be the same. That is, upon actuating the manual trigger 14, compressed air flows through the passage 126, forcing the valve cage 84 to its second or right hand position, venting to atmosphere the space 64 above the main valve body 38, permitting it to open.

When the firing valve opens, a portion of the compressed air entering the working cylinders will flow through the auto-fire valve in the manner described before. However, since the mode selector valve is in the auto-fire position shown in FIGURE 7, this air under pressure can pass from the passage 144, through the ports 156, past the formed tip 150 of the throttle rod, through the passage 132, and slots 106, into contact with the enlarged end 114 of the oscillating valve core. This air pressure will suffice to move the oscillating valve core 110-112-114 to its second or right hand position shown in FIGURE 8. At this time, the valve cage and core are in the same relative position with respect to each other that was occupied in FIGURE 2. That is, communication is once again established between the port 74 and the passage 82, thereby introducing compressed air to the space 64 above the main valve body 38, causing it to close. Closing of the main valve 26 will open the exhaust passages 62, 60, 58 from the working cylinder. This permits the working piston 22 to return to its uppermost position by any conventional means.

When the working piston 22 reaches its uppermost position, its top surface contacts the tubular actuator 160 of the auto-fire valve, opening the valve member 162, and permitting the air under pressure presently in the passage 132, the mode selector valve, and the passage 144 to exhaust to atmosphere back through the auto-fire valve, past the exhaust washer 52, and out the ports 58, 60 and 62 to atmosphere. Reduction of air pressure above or to the left of the head 114 of the oscillating valve core permits the valve core to be returned to its initial or left hand position by means of the air entering the oscillating valve through the port 126. The valve cage 84, meanwhile, will be retained in its second or right hand position so long as air under pressure remains in the passage 126. Therefore, movement of the oscillating valve core 110-112-114 to its initial position while the oscillating valve cage 84 remains in its second position will bring about the condition shown in FIGURE 4, wherein the passage 82 communicates with atmosphere to exhaust the pressure in the space 64 above the firing valve body 38, permitting it to open. This cycle will continue to repeat itself so long as the manual trigger is held in the actuated or firing position. The oscillating valve cage 84 will remain in its second position, while the core 110-112-114 oscillates back and forth between its first and second positions, as will be apparent by comparing FIGURES 4 and 8.

*Modification—General arrangement*

Referring now to FIGURES 9 through 13, a modification of the invention has been illustrated. This embodiment departs from that already disclosed in several important respects. In the first place, it will be observed that the auto-fire valve of the preceding embodiment has been eliminated. As explained in application Serial No. 445,873 to which earlier reference has been made, the primary function of the auto-fire valve is to insure that the working piston makes a full return stroke before the main or firing valve reopens to initiate the next successive stroke. This is necessary in order that a fastener to be driven can be fed ahead of the fastener driver after each return stroke. The embodiment of FIGURES 9 through 13 is particularly adapted for smaller tools, wherein the reciprocation of the working piston is so rapid that no additional means need be provided for insuring a full return stroke.

A second important difference between the modification of FIGURES 9 through 13 and that described earlier is the elimination of the auxiliary valve in the present embodiment. As will be explained hereinafter, this embodiment in fact combines the auxiliary valve and the oscillating valve of the preceding embodiment into a single unit.

Turning now to FIGURE 9, this embodiment of the invention includes a housing 200 having a rearwardly extending handle portion 202 within which is a reservoir 204 filled with compressed air. Within the housing 200 is the sleeve 206 which defines the working cylinder within which the piston 208 and fastener driver 210 are reciprocable.

This embodiment of the invention also discloses a very important modification of the springless main valve of the Letters Patent 3,170,487 noted earlier. In this embodiment, the springless main valve is indicated generally at 212, and it will be observed that it is designed to surround the cylinder sleeve 206. It is shown in the upper or closed position in FIGURES 9 and 11, and in the down or open position in FIGURE 10.

Opening and closing of the springless main valve 212 is accomplished by the oscillating valve indicated generally at 214, which will be described presently. Once again, the tool may be selectively operated in either a "single-fire" or an "auto-fire" mode of operation, the desired mode being selected by the mode selector valve indicated generally at 216. The speed of reciprocation is controlled by the throttle valve indicated generally at 218, which, in this embodiment, is separate from the mode selector valve.

*Inverted main valve*

The inverted springless main valve of this embodiment is identical in principle with the springless main valve of the earlier patent and of the foregoing embodiment. It is significantly different in design and construction, and offers certain very definite advantages. Specifically, it will be observed that by locating the main valve about the cylinder sleeve makes possible a great reduction in the overall height or size of the tool.

The inverted springless main valve includes the generally tubular body 220 having a bore 222 in one end and a bore 224 of a larger diameter in the opposite end. The body 220 is slidable within the housing 200, and about the cylinder sleeve 206. At its upper end, the body 220 carries the resilient valve seat 226 which seat on the annular rib 228 depending from the cap 230, thereby preventing fluid under pressure from flowing through the radial slot 232 and into the working cylinder.

The bore 222 of the valve is provided with the O-ring 234, while the bore 224 is provided with the O-ring 236. The O-ring 234 accomplishes a sliding seal with the cylinder sleeve 206, while the O-ring 236 moves into and out of engagement with the enlarged peripheral lug 238. It may be noted that the lug 238 performs the same function as the exhaust washer 52 of the preseding embodiment.

Under ordinary conditions of operation, and with the manual trigger in the inoperative position, compressed air from the reservoir 204 will flow into the passage 240 and the space 242, thereby acting on the lower larger surface 220b of the firing valve body 220. Air under pressure in the reservoir 204 is also acting on the shoulder 220a and on the resilient member 226, with a slight resultant downward force. This resultant downward force is of course overcome by the greater upward force exerted on the larger area 220b, thereby securely holding the main valve in its up or closed position.

To open the main valve of this modification, the passage 240 is vented to atmosphere through means described hereinafter. This reduces the pressure in the space 242 and applied to the surface 220b of the main valve body, whereby the resultant downward force on the shoulder 220a is operative to move the valve to the position shown in FIGURE 10. In this position, air from the reservoir 204 can pass through the ports 232 and into the working cylinder, driving the piston 208 and driver 210 in a working stroke.

Closure of the springless main valve is effected by reintroducing air under pressure into the space 242 through the passage 240. Since the bore 224 is larger than the bore 222, the effective surface area of the lower end 220b of the main valve is greater than the effective area of the upper end, 220a plus 220c. Therefore, when air under equal pressure is applied to both ends of the firing valve, it will move toward the end with the smaller effective surface area. This means the main valve will be returned to its closed position.

It will be noted that in this closed position, the O-ring 236 on the inner surface of bore 224 is out of engagement with the peripheral lug 238 of the cylinder sleeve 206. The working cylinder is thus vented to atmosphere through the ports 232, past the O-ring 236 and the lug 238, out the radial ports 244 in the main valve body 220, and out the port 246 to atmosphere.

*Oscillating valve—modification*

The oscillating valve of this modification includes the bore 248–250, again having a first port 252 defined by one end of the bore 248 and in continuous communication with the fluid under pressure in the reservoir 204. The bore has a second port 254 which is in continuous communication with the space below the inverted firing valve 212.

The valve cage 258 and its enlarged head 260 are slidably received respectively in the portions 248 and 250 of the oscillating valve bore. The valve cage has a first port 262 at one end which is in continuous communication with the ports 252 in the bore, and a second port 264 which is in continuous communication with the port 254 in the bore.

Slidable within the valve cage 258–260 is the oscillating valve core 266, which carries the O-rings 268 and 270 on its outer surface.

With the components in the initial or first position shown in FIGURE 9, air in the reservoir 204 can pass through the port 252, the port 262, past the O-ring 268, and through the ports 264 and 254 into the passage 240 and thence into the space 242 below the inverted springless main valve 212. As explained before, this urges the valve against its seat.

Upon movement of the manual trigger 272 to its firing position shown in FIGURES 10 and 11, the valve core 266 will be moved from its first or initial position to its second or upper position shown in FIGURE 10. In this position, the O-ring 268 has moved into contact with the inner surface of the valve cage 258 adjacent the port 262, thereby preventing communication between the port 252 and the port 254 in the bore. This serves to cut off the supply of fluid under pressure to the passage 240 and space 242 below the springless main valve. Shortly thereafter, the O-ring 270 moves out of contact with the inner surface of the valve cage and into the relieved area 274. The air under pressure in the space 242 and passage 240 can then flow through the ports 254 and 264 into the relieved space 274, past the O-ring 270, into the relieved space 276, through the radial ports 278, through the axial port 280 in the oscillating valve core, and out the slot 282 at its end to atmosphere. As explained before, this reduction in pressure applied to the surface 220b of the springless main valve permits the resultant upward force on the surface 220a to open the valve.

Upon release of the trigger 272, the conditions illustrated in FIGURE 9 will be reestablished, air under pressure will reenter the space 242, thereby forcing the main valve to its closed position.

*Mode selector valve—modification*

The mode selector valve 216 of this modification is seen in cross section in FIGURES 12 and 13. It includes the bore having the central portion 284, the inlet bore 286 of a larger diameter than the portion 284, and the outlet bore 288, which is in turn larger than the inlet bore 286.

The mode selector valve plunger includes the portions 290, 292, and 294 which mate respectively with the three portions of the mode selector valve bore. For manufacturing purposes, the plunger is made in two portions which are subsequently held together by the spring clip 296. For present purposes, however, the plunger can be considered a single element.

By comparing FIGURES 12 and 13, it will be seen that the mode selector plunger 292, 294, 296 is movable between the "single-fire" position of FIGURE 12 and the "auto-fire" position of FIGURE 13.

The inlet portion 286 of the mode selector valve bore communicates via the port 298, the air return reservoir 300 and the port 302 with the working cylinder. The outlet portion 288 of the mode selector valve bore communicates via the passage 304, the throttle valve 218, and the passage 306 with the bore 250 of the oscillating valve at a point adjacent the enlarged head 260 of the oscillating valve cage.

The central portion 290 of the mode selector valve plunger includes the the O-ring 309, which, in the "single-fire" position of the mode selector valve is in engagement with the portion 284 of the mode selector valve bore. Therefore, when air under pressure from the working cylinder passes via the port 302, reservoir 300, passage 298 and into the inlet portion 284 of the mode selector valve bore, the greater diameter of the portion 290 of the mode selector plunger will hold the mode selector valve in the single-fire position.

By comparison, when manually moved to the "auto-fire" position shown in FIGURE 13, compressed air from the working cylinder can follow the path outlined above, flow into the inlet portion 286 of the mode selector valve bore, through the central portion 284 of the bore, and into the outlet portion 288 of the bore. In this condition, the larger diameter of the plunger portion 294 as compared with the plunger portion 292 will produce a resultant tending to force the mode selector valve or at least retain the valve plunger in the "auto-fire" position.

Assuming that the mode selector valve is in the "auto-fire" position, a portion of the air admitted to the working cylinder when the firing valve 212 opens can pass through the mode selector valve, through the passage 304, the throttle control 218, and the passage 306 into the enlarged portion 250 of the oscillating valve bore, where is can act on the surface 308 of the enlarged head 260 of the oscillating valve cage. The greater effective area of the surface 308 of the oscillating valve cage causes it to be moved from the initial or down position shown in FIGURE 10 to its second or up position shown in FIGURE 11. This will bring the valve cage and core into the same position relative to each other that they occupied when both of the members were in the original position. That is, as seen in FIGURE 11, air from the reservoir 204 can now pass through the ports 252 and 262, past the O-ring 268, out the ports 264 and 254, into the passage 240 and the space 242 below the surface 220b of the springless main valve, forcing it to the closed position as already described.

When the springless main valve reaches the closed position, the working cylinder will be open to exhaust through the slots 232, past the O-ring 236 and the exhaust lug 238, out the radial ports 246 and the exhaust port 244. This permits the piston 208 to be returned to its at rest position by compressed air stored in the air return reservoir 300, as described in United States Patent No. 2,983,922 entitled Portable Stapler With Pneumatic Drive and Return.

As explained in the foregoing United States patent, this effects the exhausting of the air under pressure from the reservoir 300, which will also exhaust the air from the passages 298, the mode selector valve, the passages 304 and 306, and of course remove the air under pressure acting on the surface 308 of the oscillating valve cage. This permits the valve cage to be returned to its initial or down position by air in the reservoir 204 acting on its upper end surface, bringing the cage and core to the relative position shown in FIGURE 10, at which time the air in the space 242 and passage 240 exhausts through the ports 254 and 264, past the O-ring 270, into the relieved space 276, through the ports 278, the passage 280 and the slot 282 to atmosphere, thereby permitting the springless main valve to open. The cycle will of course continue as outlined above until the operator releases the manual trigger 272.

*Operation of the modification*

It is believed that the operation of the modification shown in FIGURES 9 through 13 will be clear from the foregoing description. By way of brief review, and assuming that the mode selector valve is in the "single-fire" position, the oscillating valve members will be in the position shown in FIGURE 9, and the springless main valve 212 will be seated. When the operator presses the manual trigger 272, this serves to lift the oscillating valve core 258-260 to its second position shown in FIGURE 10. This action first of all cuts off the supply of air under pressure to the lower surface of the springless main valve, and immediately thereafter vents this area to atmosphere through the hollow stem of the oscillating valve core. This reduction in pressure permits the net resultant downward force (220a minus 220c) to force the springless main valve down, thereby admitting compressed air from the reservoir 204 into the working cylinder, driving the piston and fastener driver downward in a working stroke.

When the piston 208 reaches its lowermost position, its top surface will be just under the ports 302 in the cylinder sleeve 206. The air under pressure acting on the piston 208 will pass through the ports 302 thereby slightly displacing the O-ring valve member 303, filling the air return reservoir 300 with air under pressure. If the mode selector valve is in the "single-fire" position, air will also pass through the passage 298 and into the inlet portion 286 of the mode selector valve bore, but from there can go no further.

The parts will remain in this position until the operator releases the trigger 272. When this happens, the oscillating valve core returns to its initial position, closing off the vent to atmosphere and permitting compressed air from the reservoir 204 to flow through the passages outlined into the space 242 below the surface 220b of the springless main valve. The greater effective area of this surface causes the springless main valve to be moved upward to its closed position. As explained before, this upward motion of the springless main valve opens the space in the working cylinder above the piston to atmosphere. When pressure in the cylinder is reduced, the O-ring 303 will be forced tightly against the ports 302, preventing passage of air therethrough, so that air in the return reservoir 300 must pass through the ports 301 to the underside of the working piston, thereby forcing it back to its uppermost or at rest position.

If the operator desires to utilize the "autofire" mode of operation, the mode selector valve plunger will be moved to the position shown in FIGURE 13. Then, upon actuation of the trigger 272, the oscillating valve core will be moved from its initial position to its second position, permitting the main valve to open as described above. And again, the piston 208 will be driven from its at rest position to its lowermost position. At this time, compressed air from the working cylinder will pass through the ports 302, past the O-ring 303, into the return reservoir 300, through the passage 298, through the mode selector valve, the passages 304 and 306, and into the oscillating valve bore 250, whereby to force the oscillating valve cage from its initial position to its second or upper position by virtue of the greater effective area of the surface 308.

When the valve cage is moved to its second position, the exhaust to atmosphere from the space below the surface 220b of the springless main valve is closed, and compressed air from the reservoir 204 is reintroduced to that space, thereby forcing the main valve to its closed position.

Closing of the main valve will open the vent to atmosphere from the working cylinder, permitting the piston to be returned by compressed air in the reservoir 300. As the piston is returned, the air in the reservoir will escape to atmosphere (through the nose of the tool) thereby eliminating the pressure acting on the surface 308, and permitting the oscillating valve cage to return to its initial position by virtue of the compressed air in the reservoir 204. As already explained, this once again closes off communication between the reservoir 204 and the space 242 below the springless main valve, opens that space to atmosphere, and permits the valve to open.

The cycle as described above will be continuously repeated until the operator releases the manual trigger 272.

*Piston retaining structure*

The embodiment shown in FIGURES 9 through 13 also includes a new structure for retaining the driving piston in its uppermost or "at rest" position. This structure includes the tapered bore 320 in the upper surface of the piston 208, and the mating tapered post 322 extending downwardly from the cap 230 into the working cylinder.

The taper of these elements will be so designed that when the piston 208 is forced upwardly on its return stroke to such an extent that the post 322 is fully seated in the bore 320, the piston 208 will be releasably locked in its uppermost or "at rest" position.

It will also be observed that the post 322 is provided with a plurality of slots 324 along its outer surface, extending substantially its full length. These slots 324 permit the air which would otherwise be trapped when the bore 320 and post 322 come into locking engagement, to escape.

*Piston-driver assembly*

It will also be observed that the modification of FIGURES 9 through 13 discloses an improved piston-driver assembly. As it will known in the art, the fastener driver is subjected to extreme stresses during operation, and breakage of a driver after a reasonable period of operation is a common thing.

By the structure shown particularly in FIGURES 9, 10 and 11, it has been possible to greatly extend the working life of the piston-fastener driver assembly.

To this end, the piston 208 is provided with an annular, depending skirt 330. The upper most portion of this skirt (the point where the skirt joins the piston 208) is relieved as at 332.

A resilient insert 334 having an annular flange at its upper end adapted to fit in the relieved portion 332 is then snugly placed placed in the confines of the skirt 330.

The resilient insert 334 is provided with an aperture 336 adapted to receive a fastener driver 210. In the embodiment shown, the aperture 336 is substantially larger than the driver 210, but this is not an important function. Rather, the insert is shown as being somewhat over size, in order that a plurality of different sized drivers may be accommodated in a single insert.

The driver 210 will be fastened to the insert 334 by means of the pin 338. It will be noted that the skirt is provided with the apertures 340 through which the pin 338 may be inserted. However, it is very important to this invention that the pin be retained only in the resilient insert 334, and that it not contact any portion of the skirt 330. This is satisfactorily accomplished by providing a pin 338 which is larger than the opening in the insert 334 into which it must fit. The pin is then forced into place, and the resilient material will expand about its tapered ends 342, thereby holding it centered and in place.

It has been discovered that piston-driver assemblies utilizing this construction can be used many times longer than was heretofore thought possible without incurring driver breakage.

It is believed that the foregoing constitutes a full and complete disclosure of the many facets of the instant invention. It will be apparent to the skilled worker in the art that various design modifications may be made in either or both embodiments, without departing from the scope and spirit of this invention. Accordingly, no limitations are intended or to be inferred, except insofar as specifically set forth in the following claims.

The embodiments of the invention in which an exclusive property or privilege is claimed are defined as follows:

1. A fastener applying device for use with a supply of fluid under pressure comprising:
   (a) a working cylinder having fastener driving means reciprocable therein;
   (b) means for successively feeding fasteners into position to be driven by said fastener driving means;
   (c) main valve means for controlling the flow of fluid into said working cylinder;
   (d) oscillating valve means comprising;
      (i) a valve bore having a first port communicating with said supply and a second port communicating with said main valve;
      (ii) two telescoping elements slidable within said valve bore, one of said elements comprising a valve cage slidable between first and second positions, and having ports in continuous communication respectively with said first and second ports of said valve bore, the other of said elements comprising a valve core sealingly slidable in said valve cage between first and second positions relative to said valve cage, said core in one of said positions relative to said cage being effective to prevent communication between said first and said second ports of said cage;
      whereby said first position of said core relative to said cage is effective to close said main valve means, and said second position of said core relative to said cage is effective to open said main valve means.

2. The device claimed in claim 1 including means for controlling movement of said cage from said first position to said second position, said last mentioned means comprising an auxiliary valve arranged to supply fluid under pressure to a portion of said cage.

3. The device claimed in claim 1 wherein said valve cage includes an enlarged end portion, and including auxiliary valve means in communication with said supply and arranged to establish communication between said supply and said enlarged end portion, whereby said cage is moved to its second position.

4. The device claimed in claim 1 including a manually operable trigger movable to a firing position, and means for controlling movement of one of said telescoping elements from its first position to its second position in response to movement of said trigger to its firing position.

5. The device claimed in claim 1 wherein said valve cage includes an enlarged end portion, said first port in said bore being disposed intermediate said enlarged end and the other end of said valve cage, whereby said valve cage is normally biased to said first position.

6. The device claimed in claim 5 wherein said valve core includes an enlarged end disposed beyond said enlarged end of said valve cage, and including auxiliary valve means in communication with said supply, and passage means extending between said auxiliary valve and a position intermediate said enlarged end portion of said valve cage and said enlarged end of said core, whereby opening of said auxiliary valve is effective to move said valve cage to said second position and to retain said valve core in said first position.

7. The device claimed in claim 6 including valve means for selectively utilizing a portion of the air admitted to said working cylinder for moving said valve core to said second position when said valve cage is in said second position.

8. The device claimed in claim 7 wherein said means for selectively utilizing a portion of the air admitted to said working cylinder includes a mode selector valve movable from a "single-fire" position to an "auto-fire" position, said "auto-fire" position establishing communication between said working cylinder and said enlarged end of said valve core, said "single-fire" position preventing communication between said working cylinder and said enlarged end of said valve core.

9. A fastener applying device for use with a supply of fluid under pressure comprising:
   (a) a working cylinder having fastener driving means reciprocable therein;
   (b) means for successfully feeding fasteners into position to be driven by said fastener driving means;
   (c) main valve means for controlling the flow of said fluid into said working cylinder;
   (d) oscillating valve means including a valve bore and a pair of cooperating, telescoping elements slidable within said bore;
   (e) operator controlled means for effecting movement of one of said elements whereby to effect opening of said main valve;
   (f) means for selectively utilizing a portion of the air admitted to said working cylinder for moving the other of said elements whereby to effect the closing of said main valve;

(g) and means for controlling the return of said other element to its initial position whereby to effect the reopening of said main valve.

10. The device claimed in claim 9 wherein said operator controlled means for moving one of said elements comprises an auxiliary valve in communication with said supply and operable to establish communication between a portion of one of said elements and said supply, whereby said one of said elements is moved to effect opening of said main valve.

11. The device claimed in claim 9 wherein said means for selectively utilizing a portion of the air admitted to said working cylinder includes a mode selector valve movable from a "single-fire" position to an "auto-fire" position, said "auto-fire" position establishing communication between said working cylinder and said other of said elements, said "single-fire" position preventing communication between said working cylinder and said other of said elements.

12. The device claimed in claim 11 wherein said means for selectively utilizing a portion of the air admitted to said working cylinder also includes valve means operative in response to piston travel within said working cylinder for effecting communication between said working cylinder and said mode selector valve.

13. In a fastener applying device for use with a supply of fluid under pressure, and including a working chamber and a main valve controlling the flow of said fluid into said chamber, oscillating valve structure comprising:
(a) a valve bore having a first port in communication with said supply and a second port in communication with a portion of said main valve;
(b) two telescoping elements slidable within said valve bore, said elements comprising;
   (i) a valve cage slidable within said bore between first and second positions, said valve cage having at least two ports in continuous communication respectively with said first and second ports of said bore,
   (ii) a valve core slidable between first and second positions relative to said cage, said core in one of said positions relative to said cage being effective to prevent communication between said first and said second ports of said cage.

14. The valve structure claimed in claim 13 wherein said valve cage comprises a tubular sleeve having at least two radial ports, one of said radial ports being in continuous communication with said first port of said valve bore, the other of said radial ports being in continuous communication with said second port of said valve bore; and including sealing means between said bore and said cage preventing direct communication between said first and said second ports of said bore; and wherein said means associated with said cooperating elements comprises at least one sealing means between said core and said cage effective in one relative position of said cage and said core to prevent communication between said radial ports.

15. The valve structure claimed in claim 14 wherein said valve cage includes an enlarged end portion, said first port in said bore being disposed intermediate said enlarged end portion and the other end of said valve cage, whereby said valve cage is normally biased to said first position.

16. The valve structure claimed in claim 15 wherein said valve core includes an enlarged end disposed beyond said enlarged end of said valve cage, and including auxiliary valve means in communication with said supply, and passage means extending between said auxiliary valve and said valve bore at a position intermediate said enlarged end portion of said valve cage and said enlarged end of said core, whereby opening of said auxiliary valve is effective to move said valve cage to said second position and to retain said valve core in said first position.

17. The device claimed in claim 1 wherein said valve core includes an outwardly extending axial portion, and including manual means for contacting said outwardly extending portion and moving said core to said second position.

18. The device claimed in claim 1 wherein said first port in said bore is coaxial with said bore at one end thereof, said second port in said bore being disposed intermediate the ends of said bore, wherein said valve cage comprises a tubular sleeve having an enlarged end, one of said ports in said cage being coaxial with said cage and at the other end thereof, the other of said ports being intermediate said one port and said enlarged end, and including sealing means between said bore and said cage preventing direct communication between said first and said second port, and sealing means between said core and said cage effective when said cage is in said first position and said core is in said second position to prevent communication between said first and said second ports.

19. The device claimed in claim 18 including valve means for selectively utilizing a portion of the air admitted to said working cylinder for moving said valve cage to said second position while said valve core remains in said second position whereby to close said main valve.

20. The device claimed in claim 19 wherein said means for selectively utilizing a portion of the air admitted to said working cylinder comprises a mode selector valve movable from a "single-fire" position to an "auto-fire" position, said "auto-fire" position establishing communication between said working cylinder and said valve cage, said "single-fire" position preventing communication between said working cylinder and said valve cage.

21. The device claimed in claim 20 wherein said mode selector valve comprises a bore having a central position of a given diameter, an inlet portion of a diameter larger than said central portion, and an outlet portion larger in diameter than said inlet portion, said inlet and outlet portions being on opposite sides of said central portion, and a plunger having three sections of different diameters adapted to fit in the respective portions of said bore and movable from a "single-fire" position to an "auto-fire" position, and includes a passage communicating with said working cylinder and with said inlet portion of said bore, a passage communicating with said oscillating valve and with said outlet portion of said bore, and sealing means associated with said central portion of said bore and of said plunger effective only when said plunger is in said "single-fire" position, whereby when said plunger is in said "single-fire" position, fluid in said first mentioned passage biases said plunger to said "single-fire" position, and whereby when said plunger is in said "auto-fire" position, said fluid in said first mentioned passage biases said plunger to said "auto-fire" position.

22. The device claimed in claim 1 wherein said means associated with said cooperating elements and said valve bore includes exhaust passage means arranged to communicate with said second port in said bore when one of said elements is in its second position and the other of said elements is in its first position.

23. The device claimed in claim 22 wherein said exhaust passage means comprises an axial passage extending at least part way through said core, and at least one radial port in said core communicating with said axial passage, said radial port communicating with said second port in said bore only when said core is in its second position and said cage is in its first position.

No references cited.

GRANVILLE Y. CUSTER, JR., *Primary Examiner.*